United States Patent
Lee et al.

(10) Patent No.: US 10,939,469 B2
(45) Date of Patent: Mar. 2, 2021

(54) V2X COMMUNICATION METHOD EXECUTED BY V2X TERMINAL IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/477,162

(22) PCT Filed: Jan. 12, 2018

(86) PCT No.: PCT/KR2018/000640
§ 371 (c)(1),
(2) Date: Jul. 10, 2019

(87) PCT Pub. No.: WO2018/131947
PCT Pub. Date: Jul. 19, 2018

(65) Prior Publication Data
US 2019/0373637 A1 Dec. 5, 2019

Related U.S. Application Data

(60) Provisional application No. 62/445,719, filed on Jan. 12, 2017.

(51) Int. Cl.
*H04W 74/08* (2009.01)
*H04W 4/40* (2018.01)
(Continued)

(52) U.S. Cl.
CPC ......... *H04W 74/0808* (2013.01); *H04W 4/40* (2018.02); *H04W 8/005* (2013.01); *H04W 28/26* (2013.01); *H04W 76/27* (2018.02)

(58) Field of Classification Search
None
See application file for complete search history.

(56) References Cited

U.S. PATENT DOCUMENTS

2015/0156662 A1* 6/2015 Bai .................. H04W 28/0236
370/231
2016/0316486 A1 10/2016 Bai et al.
(Continued)

FOREIGN PATENT DOCUMENTS

| KR | 101506598 | 3/2015 |
| WO | 2016209196 | 12/2016 |
| WO | WO 2018225883 A1 * | 12/2018 |

OTHER PUBLICATIONS

European Patent Office Application Serial No. 18738639.6, Search Report dated Nov. 6, 2019, 9 pages.
(Continued)

*Primary Examiner* — Anh Vu H Ly
(74) *Attorney, Agent, or Firm* — Lee Hong Degerman Kang Waimey

(57) ABSTRACT

Provided is a vehicle-to-X (V2X) operation method executed by a V2X UE in a wireless communication system, the method comprising: determining whether a channel busy ratio (CBR) value has changed after resource reservation is performed; and performing V2X communication based on the determination, wherein, if the CBR value has changed after the resource reservation is performed, the V2X communication is performed based on the changed CBR value.

11 Claims, 12 Drawing Sheets

(51) Int. Cl.
*H04W 76/27* (2018.01)
*H04W 8/00* (2009.01)
*H04W 28/26* (2009.01)

(56) References Cited

U.S. PATENT DOCUMENTS

| | | | |
|---|---|---|---|
| 2018/0048572 A1* | 2/2018 | Gulati | ................. H04L 47/12 |
| 2018/0124771 A1* | 5/2018 | Mok | ................. H04W 72/048 |
| 2019/0208441 A1* | 7/2019 | Wang | ................. H04W 28/0284 |
| 2019/0261216 A1* | 8/2019 | Lee | ................. H04W 4/40 |
| 2019/0313279 A1* | 10/2019 | Li | ................. H04W 28/0289 |
| 2019/0372653 A1* | 12/2019 | Chae | ................. H04B 7/14 |

OTHER PUBLICATIONS

Nokia, et al., "On congestion control for V2V communication", 3GPP TSG RAN WG1 Meeting #86bis, R1-1609788, Oct. 2016, 2 pages.
Catt, "Discussion on CBR measurements", 3GPP TSG RAN WG1 Meeting #87, R1-1611333, Nov. 2016, 3 pages.
PCT International Application No. PCT/KR2018/000640, International Search Report dated Apr. 11, 2018, 4 pages.
Catt, "Discussion on CBR measurements," 3GPP TSG-RAN WG1 #87, R1-1611333, Nov. 2016, 5 pages.
Panasonic, "Discussion on CBR measurement and congestion control behavior," 3GPP TSG-RAN WG1 #87, R1-1612111, Nov. 2016, 4 pages.
Samsung, et al., "WF on CBR measurement of PUE," 3GPP TSG-RAN WG1 #87, R1-1613466, Nov. 2016, 5 pages.

\* cited by examiner

V2X COMMUNICATION METHOD EXECUTED BY V2X TERMINAL IN WIRELESS COMMUNICATION SYSTEM, AND TERMINAL USING SAME

CROSS-REFERENCE TO RELATED APPLICATIONS

This application is the National Stage filing under 35 U.S.C. 371 of International Application No. PCT/KR2018/000640, filed on Jan. 12, 2018, which claims the benefit of U.S. Provisional Application No. 62/445,719, filed on Jan. 12, 2017, the contents of which are all hereby incorporated by reference herein in their entirety.

BACKGROUND OF THE INVENTION

Field of the Invention

The present invention relates to wireless communication and, more particularly, to a V2X communication method executed by a V2X terminal in a wireless communication system and a terminal using the method.

Related Art

In the International Telecommunication Union Radio communication sector (ITU-R), the standardization task of International Mobile Telecommunication (IMT)-Advanced, that is, a next-generation mobile communication system after the 3rd generation, is in progress. IMT-Advanced has an object of supporting multimedia services based on the Internet protocol (IP) at a transfer rate of 1 Gbps in the still and low-speed moving state and 100 Mbps in the high-speed moving state.

3rd Generation Partnership Project (3GPP) is a system standard that satisfies the requirements of IMT-Advanced and prepares LTE-advanced (LTE-A) improved from long term evolution (LTE) based on the orthogonal frequency division multiple access (OFDMA)/single carrier-frequency division multiple access (SC-FDMA) transmission method. LTE-A is one of strong candidates for IMT-Advanced.

There is recently a growing interest in the device-to-device (D2D) technology for direct communication between devices. Specifically, D2D has been in the spotlight as a communication technology for a public safety network. A commercial communication network rapidly changes into LTE, but the current public safety network is chiefly based on the 2G technology due to the problem of a collision against the existing communication standard and in terms of costs. Such a technology gap and needs for improved services lead to efforts to improve the public safety network.

The D2D communication described above may be extended to be applied to transmission and reception of signals between vehicles, and communication related to vehicles is specifically termed vehicle-to-everything (V2X) communication. In V2X, the alphabet 'X' represents a pedestrian (communication between a vehicle and a device carried by an individual (e.g., handheld terminal carried by a pedestrian, cyclist, driver, or passenger), here, V2X may be represented by V2P), a vehicle (communication between vehicles, here, V2V), an infrastructure/network (communication between a vehicle and a roadside unit (RSU)/network (e.g., RSU is a transportation infrastructure entity, (e.g., an entity transmitting speed notifications) implemented in an eNB or a stationary UE)) (V2I/N), and the like. A (V2P communication-related) device carried by a pedestrian (or a person) will be referred to as a "P-UE" and a (V2X communication-related) device installed in a vehicle will be referred to as a "V-UE". In the present disclosure, the term of "entity" may be interpreted as at least one of "P-UE", "V-UE", and RSU (/network/infrastructure).

A V2X terminal may perform V2X communication through resource reservation based on Channel Busy Ratio (CBR). At this time, once resource reservation is performed by a V2X terminal, a considerable amount of time may be needed until the resource may be reserved again.

CBR may be changed even after resource reservation has been performed. However, in the conventional technology, once a V2X terminal performs resource reservation based on the CBR, the V2X terminal has to perform V2X communication for a while based on the previous CBR value even if the CBR has changed after the resource reservation.

As described above, if a terminal still performs V2X communication based on the previous CBR even though the CBR has changed, since the terminal continues to perform V2X communication based on the previous CBR even when the CBR is increased after resource reservation (for example, when the ratio of occupied sub-channels is increased by other terminals after the resource reservation), it is highly likely that V2X communication by the terminal is interfered with V2X communication by other terminals.

Therefore, the present invention proposes a method for a V2X terminal to perform V2X communication by reflecting a changed CBR when the CBR is changed and a device using the method.

SUMMARY OF THE INVENTION

A technical object of the present invention is to provide a method for performing V2X communication executed by a V2X UE in a wireless communication system and a UE using the method.

In an aspect, a method for performing Vehicle-to-X (V2X) operation by a V2X User Equipment (UE) in a wireless communication system is provided. The method may comprise determining whether a Channel Busy Radio (CBR) value has changed after a resource reservation is performed, and performing V2X communication based on the determination. Here, if the CBR value has changed after the resource reservation is performed, the V2X communication is performed based on the changed CBR value.

If the CBR value has been increased after the resource reservation is performed, the V2X UE may perform the V2X communication based on changed frequency resources.

The V2X UE may perform the V2X communication based on reduced frequency resources.

The V2X UE may perform the V2X communication based on the reduced frequency resources and existing time resources.

If the CBR value has been increased after the resource reservation is performed, the V2X UE may perform the V2X communication based on a sub-set of existing frequency resources or existing time resources.

If the V2X UE performs transmission with a period longer than a previous one, the V2X UE may perform transmission as many times as allowed by using a sub-set of reserved resources with the previous period.

If the CBR value has been increased after the resource reservation is performed, the V2X UE may signal change information of a transmission period.

If the CBR value has been increased after the resource reservation is performed, the V2X UE may signal information about whether to perform re-transmission.

If the CBR value has been increased after the resource reservation is performed, the V2X UE may signal information about the number of remaining transmissions.

If change of the CBR value is larger than a preconfigured threshold value, the V2X UE may determine that the CBR value has changed after the resource reservation is performed.

If the CBR value has changed before the resource re-reservation is triggered after the resource reservation is performed, the V2X UEs may perform the V2X communication based on the changed CBR value.

In another aspect, a Vehicle-to-X (V2X) User Equipment (UE) is provided. The V2X UE may comprise a Radio Frequency (RF) unit transmitting and receiving a radio signal and a processor operating in conjunction with the RF unit, wherein the processor is configured to determine whether a Channel Busy Radio (CBR) value has changed after a resource reservation is performed and perform V2X communication based on the determination, wherein, if the CBR value has changed after the resource reservation is performed, the V2X communication is performed based on the changed CBR value.

According to the present invention, since a UE performs V2X communication based on a changed CBR, the possibility that V2X communication of the UE is interfered with V2X communication of other UE may be lowered.

Also, according to the present invention, the problem that a resource re-reservation operation is performed (or triggered) excessively due to change of the CBR measurement value (for example, the problem that the probability of collision of (reserved) resources among UEs is increased) may be alleviated.

DESCRIPTION OF EXEMPLARY EMBODIMENTS

Figure 1:
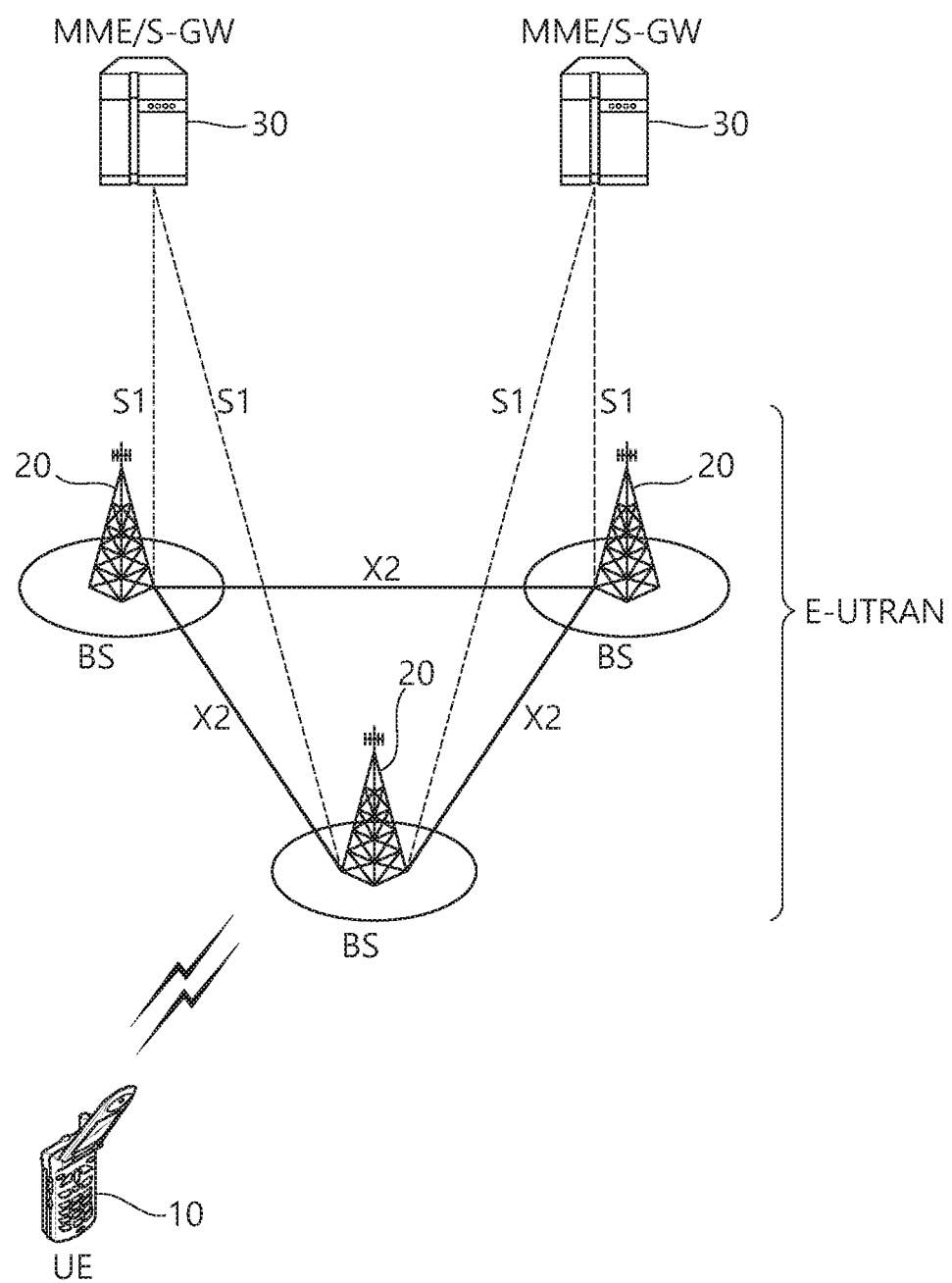
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 2:
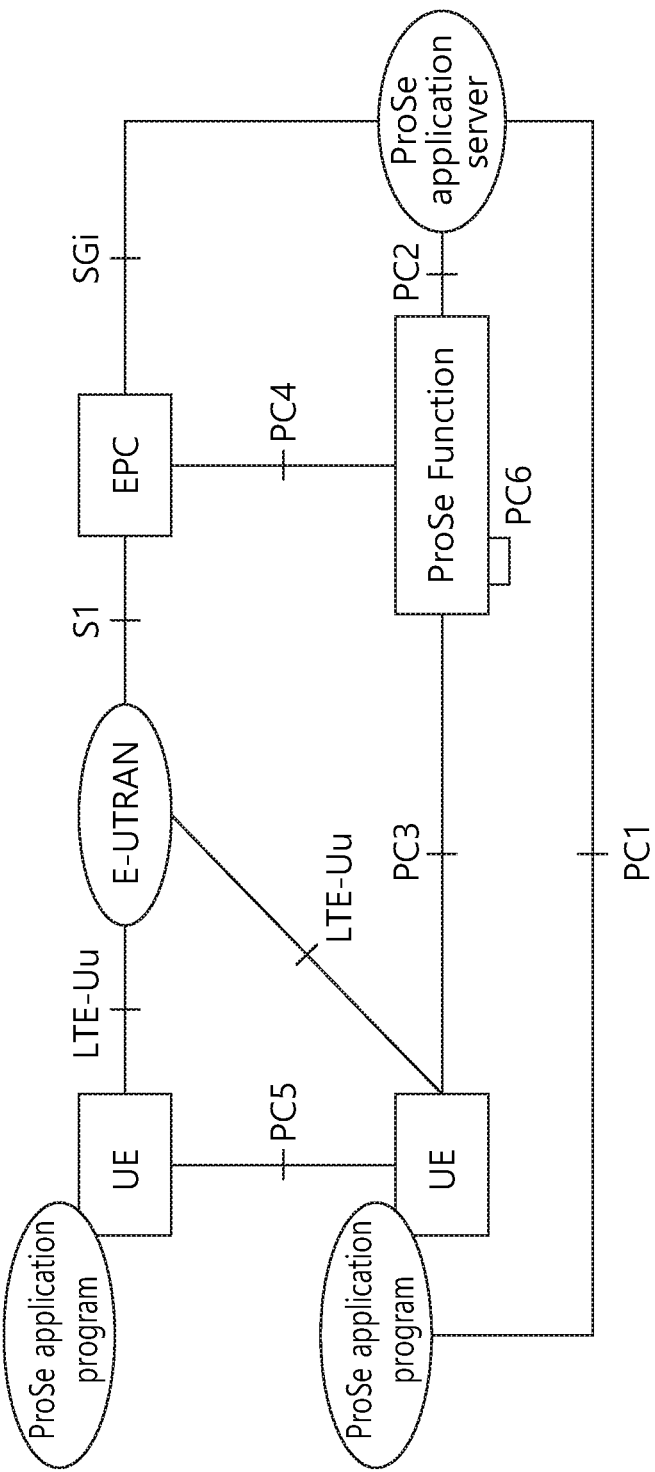
FIG. 2 illustrates a reference structure for a ProSe.

FIG. 2 illustrates a reference structure for a ProSe.

Referring to FIG. 2, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 3:
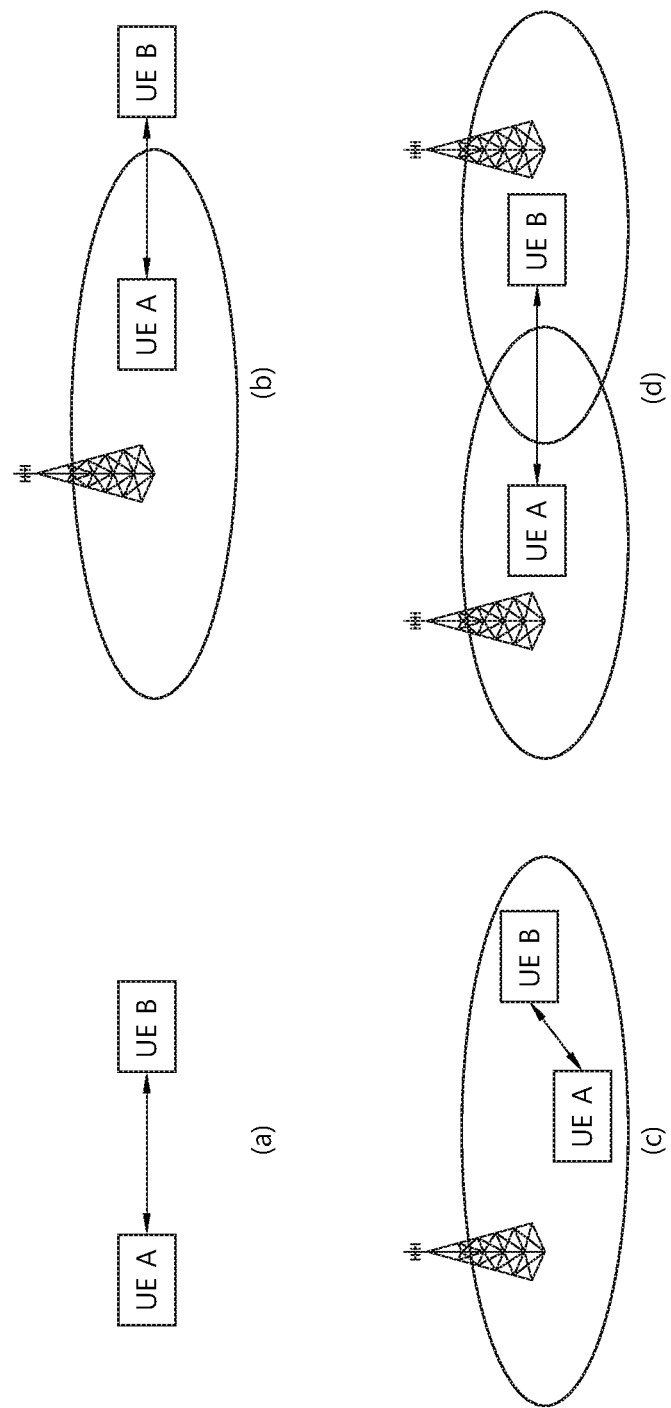
FIG. 3 illustrates arrangement examples of terminals performing ProSe direct communication and cell coverage.

FIG. 3 illustrates arrangement examples of terminals performing ProSe direct communication and cell coverage.

Referring to FIG. 3(a), UEs A and B may be located outside of the cell coverage. Referring to FIG. 3(b), the UE A may be located in the cell coverage and the UE B may be located outside of the cell coverage. Referring to FIG. 3(c), both of UEs A and B may be located in the cell coverage. Referring to FIG. 3(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 4:
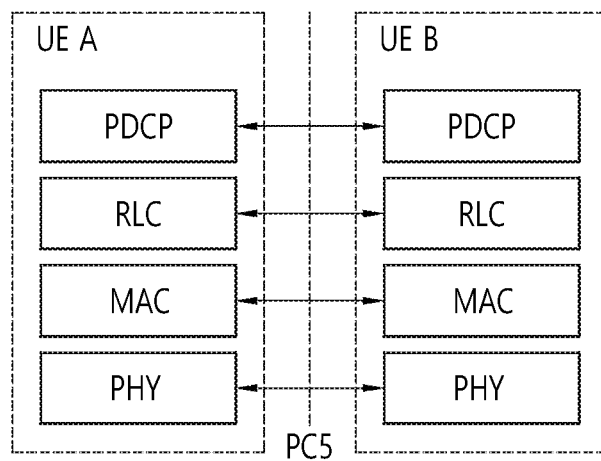
FIG. 4 illustrates a user plane protocol stack for the ProSe direct communication.

FIG. 4 illustrates a user plane protocol stack for the ProSe direct communication.

Referring to FIG. 4, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 5:
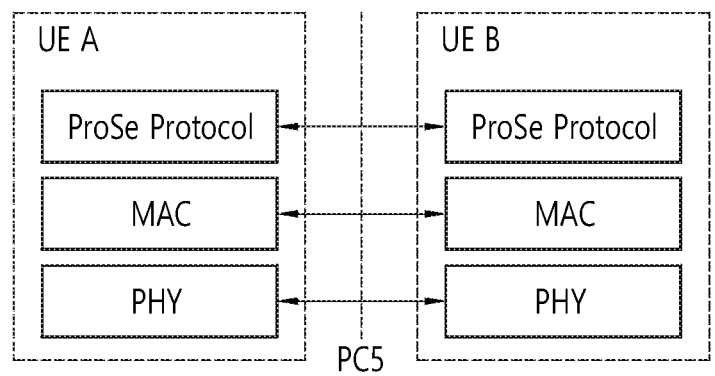
FIG. 5 illustrates a PC 5 interface for D2D discovery.

FIG. 5 illustrates a PC 5 interface for D2D discovery.

Referring to FIG. 5, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

<V2X (Vehicle-to-X) Communication>

As described above, in general, a D2D operation may have various advantages in that it is signal transmission/reception between close devices. For example, a D2D terminal may perform data communication at a high transfer rate and with low latency. Furthermore, the D2D operation can distribute traffic concentrated on an eNB. If a terminal performing a D2D operation plays the role of a relay, the D2D operation may also function to extend coverage of an eNB. Communication related to a vehicle, including signal transmission/reception between vehicles as the extension of the aforementioned D2D communication, is specially called VEHICLE-TO-X (V2X) communication.

In this case, for example, in V2X (VEHICLE-TO-X), a term "X" means A PEDESTRIAN (COMMUNICATION BETWEEN A VEHICLE AND A DEVICE CARRIED BY AN INDIVIDUAL (example) HANDHELD TERMINAL CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (example) RSU IS A TRANSPORTATION INFRASTRUCTURE ENTITY (example) AN ENTITY TRANSMITTING SPEED NOTIFICATIONS) IMPLEMENTED IN AN eNB OR A STATIONARY UE)) (V2I/N), etc. Furthermore, for example, for convenience of description of proposed methods, a device (related to V2P communication) carried by a pedestrian (or person) is named a "P-UE", and a device (related to V2X communication) installed on a vehicle is named a "V-UE." Furthermore, in the present invention, for example, a term "entity" may be construed as being a P-UE and/or a V-UE and/or an RSU (/NETWORK/INFRASTRUCTURE).

A V2X UE may perform message (or channel) transmission on a previously defined (or signaled) resource pool. In this case, the resource pool may mean a resource(s) previously defined so that the UE performs a V2X operation (or capable of performing the V2X operation). In this case, the resource pool may be defined from the viewpoint of time-frequency, for example.

Meanwhile, in V2X, a mode 3 may correspond to a scheduling mode based on a base station, and a mode 4 may correspond to a self-scheduling mode of a terminal. In this case, the terminal based on the mode 4 may determine a transmission resource on the basis of sensing, and thereafter performs V2X communication through the determined transmission resource.

Meanwhile, in the aforementioned V2X system, a V2X UE may perform V2X communication based on sensing. For example, a V2X UE may perform V2X communication based on Channel Busy Ratio (CBR), and the V2X UE may perform V2X communication based on channel occupancy ratio (CR).

Here, CBR may be defined with respect to congestion measurement through PC5 for V2X UEs (namely V-UEs).

For example, CBR may indicate a portion of sub-channels in which S-RSSI measured during a specific time period (for example, 100 ms) exceeds a pre-configured threshold value. Also, only the sub-channels belonging to a resource pool may be used for measurement.

For a UE in mode 3, a base station may indicate a set of resources by which the UE performs the measurement. For a UE in mode 4, measurement may be pool-specific. Here, the UE may measure a current transmission pool of at least one UE. Moreover, a V2X UE may measure all of the resource pools by using a transmission pool.

Here, selection of a set of values of allowed radio layer parameters may support congestion control.

For example, a base station assistive configuration and a UE autonomous transmission parameter configuration (or reconfiguration) may be supported. Moreover, transmission parameter configuration (or reconfiguration) based on CBR and priority may also be supported.

Here, CR may be defined as the total number of sub-channels used by a UE for transmission divided by the total number of sub-channels configured in a measurement period (for example, 1000 ms).

Here, a set of radio layer parameters for which allowed values are limited by congestion control may be as follows. For example, information such as maximum transmission power (including zero power transmission), range of the number of retransmissions per transmission block (TB), range of the number of Physical Sidelink Control Channel (PSSCH) RBs (due to the sub-channel size), range of Modulation Coding Scheme (MCS) and/or maximum limit (CR_limit) on the occupancy ratio may be limited.

Here, a look-up table may be linked to the CBR range together with the transmission parameter values for each ProSe Per-Packet Priority (PPPP). Here, the look-up table may be configured or pre-configured, which may be supported up to 16 CBR ranges.

In what follows, CBR and CR will be described in more detail.

<Channel Busy Ratio (CBR)>

CBR measured at subframe n may be defined as follows.

CBR may indicate a portion of sub-channels in a resource pool in which S-RSSI measured by a UE during a subframe period of [n−100, n−1] with respect to the PSSCH is detected to exceed a preconfigured threshold value.

CBR may indicate a portion of sub-channels in a resource pool in which S-RSSI measured by a UE during a subframe period of [n−100, n−1] with respect to the PSSCH is detected to exceed a preconfigured threshold value, in a pool configured so that a Physical Sidelink Control Channel (PSCCH) may be transmitted from non-contiguous resource blocks together with the PSSCH corresponding to the PSCCH. Here, it may be assumed that a PSCCH pool is composed of resources in pairs of two contiguous Physical Resource Blocks (PRBs) in the frequency domain.

The CBR may be applied to RRC_IDLE intra-frequency, RRC_IDLE inter-frequency, RRC_CONNECTED intra-frequency and/or RRC_CONNECTED inter-frequency.

Here, a subframe index may be based on the physical subframe index.

For the convenience of understanding, CBR may be described with reference to a related drawing as follows.

Figure 6:
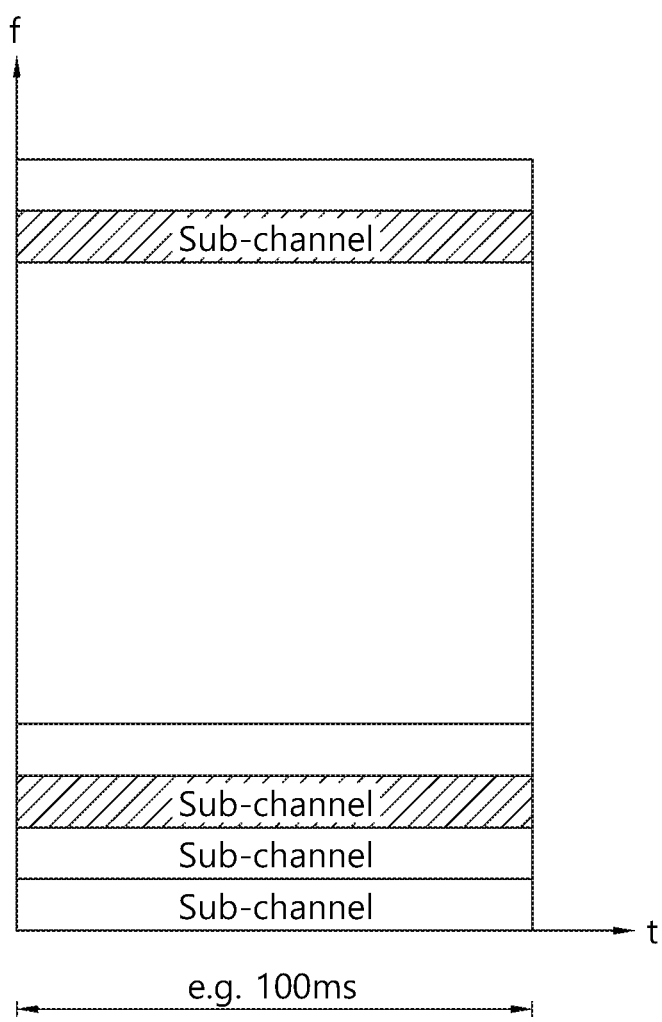
FIG. 6 illustrates one example of CBR.

FIG. 6 illustrates one example of CBR.

Referring to FIG. 6, CBR may indicate the number of sub-channels in which, when a UE measures Received Signal Strength Indicator (RSSI) in sub-channel units for 100 ms, the RSSI measurement is larger than a preconfigured threshold value. In other words, CBR may indicate the ratio of sub-channels in which the RSSI measurement is larger than a preconfigured threshold value among sub-channels during a specific period. For example, if it is assumed that the hatched sub-channels are those in which the RSSI measurement is larger than a preconfigured threshold value, CBR may indicate the ratio of the hatched sub-channels during the period of 100 ms.

<Channel Occupancy Ratio: CR>

The CR evaluated at subframe n may be defined as follows.

CR may indicate the number of sub-channels granted in the subframe period of [n−a, n−1] and subframe period of [n, n+b] and used by a UE for transmission, divided by the number of sub-channels configured in a transmission pool in the subframe period of [n−a, n+b].

CR may be applied to RRC_IDLE intra-frequency, RRC_IDLE inter-frequency, RRC_CONNECTED intra-frequency and/or RRC_CONNECTED inter-frequency.

Here, a may be a positive integer, and b may be zero or positive integer. a and b may be determined by a UE; and at this time, 'a+b+1=1000', 'a>=500', and n+b should not exceed the last transmission opportunity of the grant for the current transmission.

Here, CR may be evaluated for each (re)transmission.

Here, when CR is evaluated, a UE may assume that the transmission parameter used for subframe n may be reused according to a previous grant in the subframe period of [n+1, n+b] without a packet drop.

Here, subframe index may be based on a physical subframe index.

Here, CR may be calculated for each priority level.

In what follows, Sidelink Received Signal Strength Indicator (S-RSSI) and PSSCH Reference Signal Receiver Power (PSSCH-RSRP) will be described.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Here, the reference point of S-RSSI may be an antenna connector of a UE.

If receiver diversity is used by the UE, a reported value may not be lower than the corresponding S-RSSI of an arbitrary individual diversity branch.

S-RSSI may be applied to RRC_IDLE intra-frequency, RRC_IDLE inter-frequency, RRC_CONNECTED intra-frequency and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Here, the reference point of the PSSCH-RSRP may be an antenna connector of a UE.

If receiver diversity is used by the UE, a reported value may not be lower than the corresponding PSSCH-RSRP of an arbitrary individual diversity branch.

PSSCH-RSRP may be applied to RRC_IDLE intra-frequency, RRC_IDLE inter-frequency, RRC_CONNECTED intra-frequency and/or RRC_CONNECTED inter-frequency.

Here, power per resource element may be determined from the energy received from valid part of symbols, except for CP.

In what follows, the present invention will be described.

As described above, a V2X UE may perform V2X communication through resource reservation based on the CBR. At this time, once resource reservation by the V2X UE is performed, a considerable amount of time may be needed until the resource is reserved again.

CBR may be changed even after resource reservation has been performed. However, in the conventional technology, once a V2X UE performs resource reservation based on the CBR, the V2X UE has to perform V2X communication for a while based on the previous CBR value even if the CBR has changed after the resource reservation.

As described above, if a UE still performs V2X communication based on the previous CBR even after the CBR has changed, the UE continues to perform V2X communication based on the previous CBR even when the CBR is increased after resource reservation (for example, when the ratio of occupied sub-channels is increased by other UEs after the resource reservation), it is highly likely that V2X communication by the UE is interfered with V2X communication by other UEs.

Therefore, the present invention proposes a method for a V2X UE to perform V2X communication by reflecting a changed CBR when the CBR is changed and a device using the method.

As one example, the following methods propose a method for applying a RADIO-LAYER (TX) PARAMETER restriction (for each preconfigured (or signaled) CBR measurement and/or V2X message priority) efficiently when a CBR measurement value has changed (before resource re-reservation is triggered) after resource reservation has been performed.

Here, as one example, if the following proposed rules are applied, the problem that a resource re-reservation operation is performed (or triggered) excessively due to change of the CBR measurement value (for example, the problem that the probability of collision of (reserved) resources among UEs is increased) may be alleviated.

Here, as one example, the proposed methods of the present invention may be applied in a limited manner only to the case where change (or degree of change) of the CBR measurement is larger than a preconfigured (or signaled) threshold value. Here, as one example, when change of the RADIO-LAYER (TX) PARAMETER is required (at the time resource re-reservation is performed) due to change of the CBR measurement value (by more than a preconfigured (or signaled) threshold value), the operation for determining whether to reuse (or maintain) the probability-based previous (reserved) resources may be made not to be performed.

Figure 7:
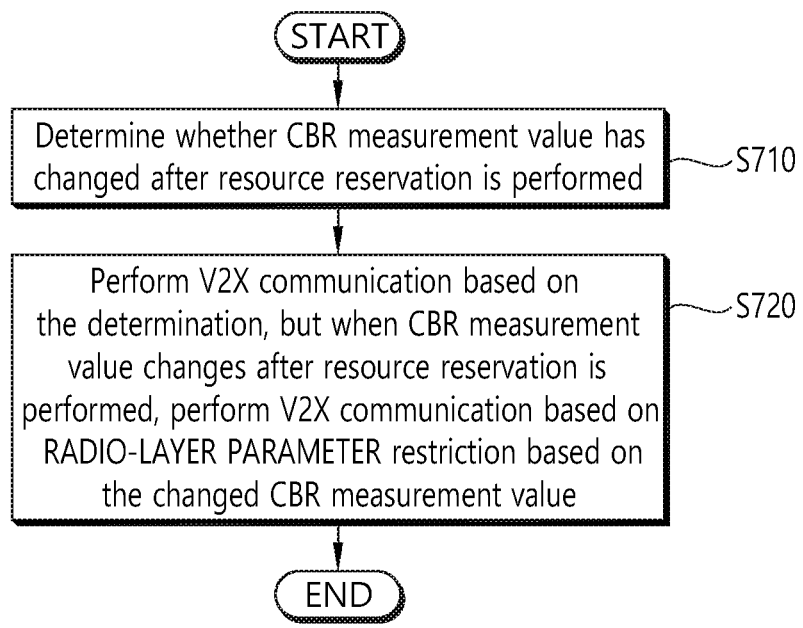
FIG. 7 illustrates a flow diagram of a method for performing V2X communication according to one embodiment of the present invention.

FIG. 7 illustrates a flow diagram of a method for performing V2X communication according to one embodiment of the present invention.

According to FIG. 7, a UE may determine whether the CBR measurement value has changed (before resource re-reservation is triggered) after resource reservation has been performed S710. At this time, the UE may be a V2X UE, and the CBR is as described above.

Afterwards, the UE may perform V2X communication based on the determination and when the CBR measurement value has changed (before resource re-reservation is triggered) after resource reservation has been performed, may perform V2X communication based on the (preconfigured (or signaled)) RADIO-LAYER (TX) PARAMETER restriction according to the changed CBR measurement value S720.

As one example, if the CBR value is increased (before the resource re-reservation is triggered) after the resource reservation has been performed, the V2X UE may perform the V2X communication based on changed frequency resources (according to the (preconfigured (or signaled) RADIO-LAYER (TX) PARAMETER restriction). At this time, the V2X UE may perform the V2X communication based on the reduced frequency resources. At this time, the V2X UE may perform the V2X communication based on the reduced frequency resources and/or previous time resources. Detailed descriptions of the present embodiment will be given later for the convenience of descriptions.

As one example, if the CBR value is increased (before the resource re-reservation is triggered) after the resource reservation has been performed, the V2X UE may perform the V2X communication based on a sub-set of previous frequency resources and/or previous time resources. At this time, if the V2X UE performs transmission with a period longer than an existing one, the V2X UE may perform transmission as many times as allowed by using the sub-set of (time) resources reserved with the existing period. Detailed descriptions of the present embodiment will be given later for the convenience of descriptions.

As one example, if the CBR value is increased (before the resource re-reservation is triggered) after the resource reservation has been performed, the V2X UE may signal change information of a transmission period. Also, if the CBR value is increased (before the resource re-reservation is triggered) after the resource reservation is performed, the V2X UE may signal information about whether to perform re-transmission. Also, if the CBR value is increased (before the resource re-reservation is triggered) after the resource reservation is performed, the V2X UE may signal information about the number of remaining transmissions. Detailed descriptions of the present embodiment will be given later for the convenience of descriptions.

As one example, if change of the CBR value is larger than a preconfigured threshold value, the V2X UE may determine that the CBR value has changed (before the resource re-reservation is triggered) after the resource reservation is performed. Detailed descriptions of the present embodiment will be given later for the convenience of descriptions.

In what follows, a more detailed description about an embodiment of a method for performing V2X communication by a UE based on a changed CBR measurement value will be given with reference to a related drawing.

[Proposed method #1] As one example, (if the CBR measurement value is increased (before resource re-reservation is triggered) after resource reservation is performed) the number of frequency resources (for example, PSSCH RBs) (and/or MCS and/or transmission power and/or the number of re-transmissions per TB) may be changed according to a preconfigured (or signaled) RADIO-LAYER (TX) PARAMETER restriction, but (previous) time resource reservation-related PSCCH information (for example, whether to perform re-transmission and (re-transmission) resource reservation information) may be made not to be changed.

Here, as one example, if the corresponding rule is applied, according to the changed (or decreased) number of frequency resources (and/or MCS), (related) PSCCH information is updated while, on the other hand, (even if re-transmission is actually skipped (due to the RADIO-LAYER (TX) PARAMETER restriction)) the time resource-related PSCCH information is maintained the same as the previous operation (for example, the same as re-transmission is performed). Here, as one example, through application of the rule, the RADIO-LAYER (TX) PARAMETER restriction (due to a changed CBR measurement value) may be reflected to the maximum while not performing the resource re-reservation operation.

Figure 8:
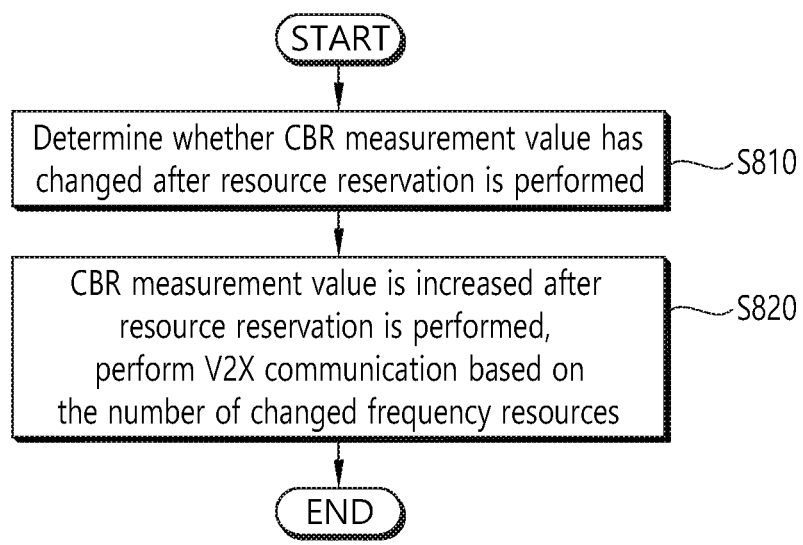
FIG. 8 illustrates a flow diagram of one embodiment of a method for performing V2X communication according to the proposed method #1.

FIG. 8 illustrates a flow diagram of one embodiment of a method for performing V2X communication according to the proposed method #1.

Referring to FIG. 8, a UE may determine whether the CBR measurement value has changed (before resource re-reservation is triggered) after resource reservation is performed S810.

Afterwards, if the CBR measurement value is increased (before resource re-reservation is triggered) after resource reservation is performed, the UE may perform V2X communication based on the changed number of frequency resources S820. In other words, if the CBR measurement value is increased (before resource re-reservation is triggered) after resource reservation is performed, the UE may adjust only the number of frequency resources without adjusting transmission of time resources.

For example, when the UE adjusts transmission not only for frequency resources but also time resources, the UE may not perform transmission at a specific time point. While the UE does not perform transmission at the specific time point, other UEs may determine that traffic at the specific time point is not congested and perform V2X communication by reserving resources related to the specific time point. In this manner, when a UE adjusts transmission even for time resources, a congested transmission situation may result between the UE and the other UEs. In this case, since the proposed method #1 provides a structure that limits only frequency resources, the aforementioned problem may be prevented.

One example of a structure limiting frequency resources according to the proposed method #1 will be described with reference to a related drawing as follows.

Figure 9:
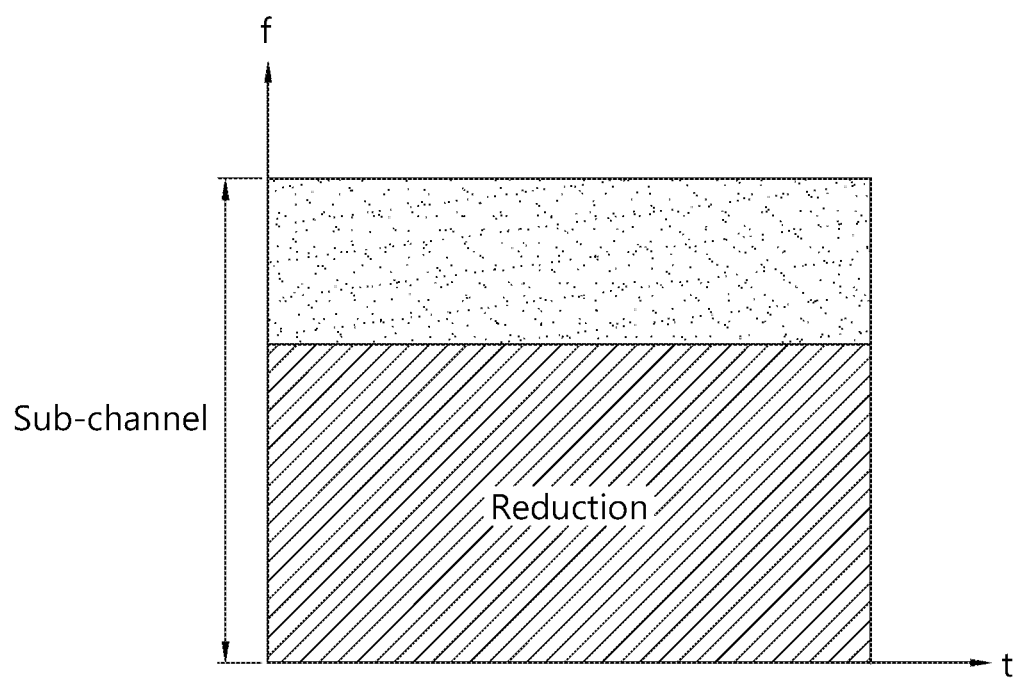
FIG. 9 illustrates one example of a structure that limits frequency resources according to the proposed method #1.

FIG. 9 illustrates one example of a structure that limits frequency resources according to the proposed method #1.

Referring to FIG. 9, if the CBR measurement value is increased (before resource re-reservation is triggered) after resource reservation is performed, the number of frequency resources (for example, the number of PSSCH RBs) may be reduced along the frequency axis. For the convenience of descriptions, FIG. 9 assumes that the reduced frequency area corresponds to a lower part of a sub-channel; however, the present invention is not limited to the assumption that the reduced frequency area is a lower part of a sub-channel. In other words, the reduced frequency area may correspond to an upper or central part of a sub-channel or may be distributed across the sub-channel.

In the proposed method #1, it has been described that for most cases, transmission is not adjusted for time resources, but only the number of frequency resources is adjusted. However, in the present invention, adjustment of transmission for time resources is not necessarily limited. In what follows, (if the CBR measurement value is increased (before resource re-reservation is triggered) after resource reservation is performed) adjusting according to a preconfigured (or signaled) RADIO-LAYER (TX) PARAMETER restriction in the form of sub-sets of previously reserved (time/frequency) resources is described as an embodiment.

[Proposed Method #2] As one example, adjustment according to the preconfigured (or signaled) RADIO-LAYER (TX) PARAMETER restriction in the form of sub-sets of previously reserved (time/frequency) resources (if the CBR measurement value is increased (before resource re-reservation is triggered) after resource reservation is performed) may be performed. Here, as one example, (A) if the number of retransmissions per TB is reduced from "1" to "0", (actual) transmission may be made to be performed only on the existing, first (or second) transmission-related reserved resource and/or (B) if transmission has to be performed with a longer period (for example, "2T") than the existing period (for example, "T") due to decrease of CR_LIMIT, the allowed (remaining) number of transmissions may be made to be performed by using (only) the sub-set of (time) resources reserved with the existing period (for example, transmission is performed by using even-numbered (or odd-numbered) (time) resources reserved with the existing period) and/or (C) if the number of frequency resources is reduced, transmission may be made to be performed by using (only) the sub-set of (frequency) resources (area) reserved previously.

Here, as one example, when the aforementioned rule is applied, (A) (as described in the [Proposed Method #1]) (related) PSCCH information may be updated according to the number of changed (or reduced) frequency resources while PSCCH information related to time resource reservation (for example, information about whether to perform re-transmission and (re-transmission) resource reservation information) is maintained the same as before (even if re-transmission (and/or part of transmission (corresponding to periodic time points)) is in fact omitted) or (B) (related) PSCCH information may be made to be updated according to (at least) the changed number of frequency resources and/or whether to perform re-transmission and/or transmission period.

Figure 10:
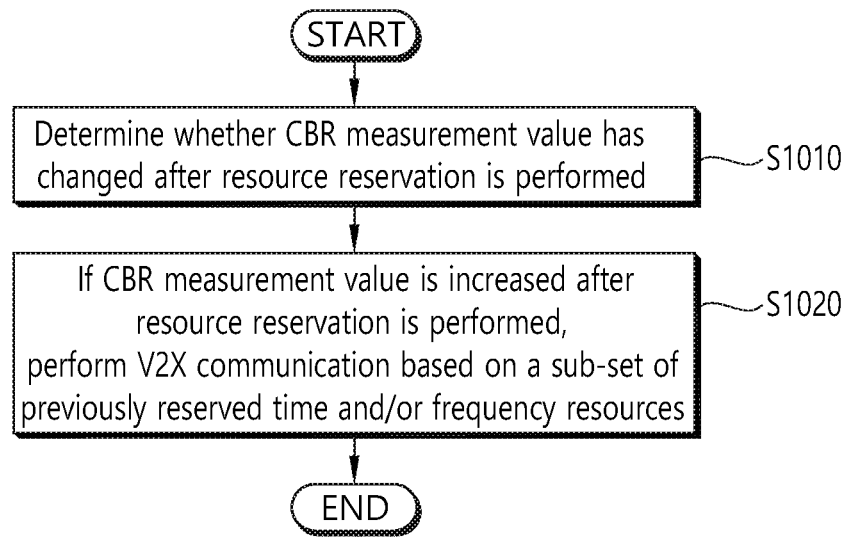
FIG. 10 illustrates a flow diagram of one embodiment of a method for performing V2X communication according to the proposed method #2.

FIG. 10 illustrates a flow diagram of one embodiment of a method for performing V2X communication according to the proposed method #2.

Referring to FIG. 10, after resource reservation is performed, the UE may determine whether the CBR measurement value has changed (before resource re-reservation is triggered) S1010.

Afterwards, if the CBR measurement value is increased after resource reservation is performed (before resource re-reservation is triggered), the UE may perform V2X communication based on a sub-set of previously reserved time and/or frequency resources S1020. In other words, if the CBR measurement value is increased after resource reservation is performed (before resource re-reservation is triggered), the UE may perform adjustment even for time resources.

[Proposed Method #3] As one example, (if the CBR measurement value is increased after resource reservation is performed (before resource re-reservation is triggered)) through (an existing (for example, "RESERVED FIELD") or newly defined) field on the PSCCH, (A) whether the transmission period is changed (or increased) (and/or changed (or increased) period information and/or the ratio of existing transmissions omitted) (for example, (through which) a receiver UE may figure out that the corresponding transmitter UE is to omit transmission at part of existing periodic time points) and/or (B) information about the number of remaining transmissions based on the existing CR_LIMIT (for example, (through which) a receiver UE may (implicitly) figure out that transmission is omitted at part of existing periodic time points from DTX detection of a V2X message related to the transmitter UE (according to the changed (or reduced) CR_LIMIT)) may be made to be signaled.

Figure 11:
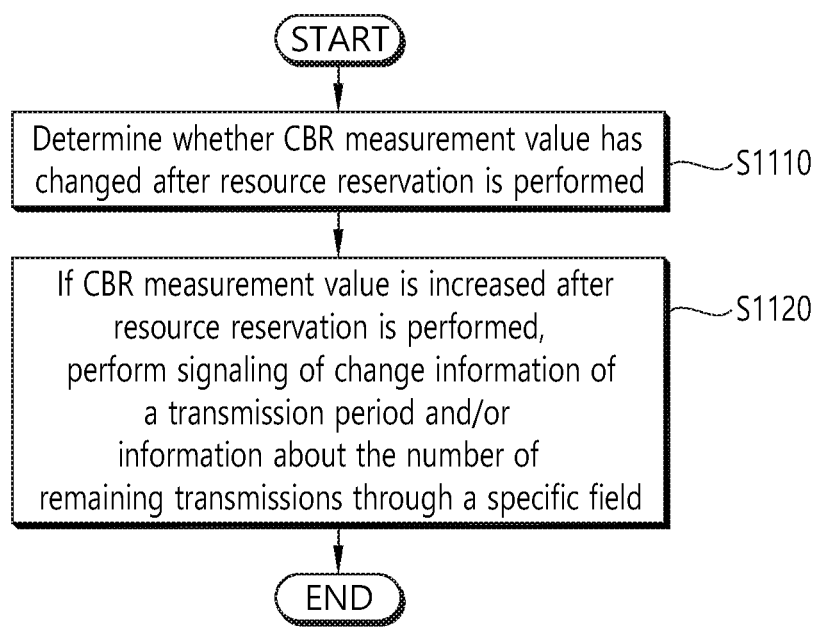
FIG. 11 illustrates a flow diagram of one embodiment of a method for performing V2X communication according to the proposed method #3.

FIG. 11 illustrates a flow diagram of one embodiment of a method for performing V2X communication according to the proposed method #3.

Referring to FIG. 11, the UE may determine whether the CBR measurement value has changed (before resource re-reservation is triggered) after resource reservation is performed S1110.

Afterwards, if the CBR measurement value is increased (before resource re-reservation is triggered) after resource reservation is performed, the UE may signal change information of a transmission period and/or information about the number of remaining transmissions through a specific field S1120.

Regarding change information signaling of the transmission period, a UE used conventionally not to be allowed to change transmission period information (transmitted on the PSCCH) until resource re-reservation is triggered again after the UE performs resource reservation. However, if the proposed method (namely the operation of adjusting time resources if the CBR measurement value is increased (before resource re-reservation is triggered) after resource reservation is performed) is applied, and the conventional rule is maintained as described above, other UEs are unable to figure out the period change information of the corresponding transmitter UE; therefore, it becomes difficult to perform V2X communication efficiently. To solve the aforementioned problem, the proposed method #3 attempts to transmit information about the changed period to other UEs. Through this operation, receiver UEs may figure out that the corresponding transmitter UE is supposed to omit transmission at part of existing periodic time points or to change the transmission period. Also, the UE may transmit not only the change information of the transmission period but also indication information about whether the UE is supposed to perform re-transmission.

Here, if the CBR is increased, the UE may increase the reservation period or may not perform re-transmission. In this way, if the UE increases the reservation period as the CBR is increased, the UE may transmit information about the increased reservation period to other UEs while, if the UE does not perform re-transmission, the UE may transmit, to the other UEs, the information indicating that the UE does not perform re-transmission.

Regarding signaling information about the number of remaining transmissions, a UE used conventionally not to transmit information about how much more the UE is to (actually) perform further transmission during the resource period reserved by the UE (for example, resources may be reserved for a relatively longer period than the period during which transmission is actually performed or a relatively larger number of resources than the number of actual transmissions performed may be reserved). However, if such information is signaled, receiver UEs may figure out that the transmitter UE omits transmission at part of existing periodic time points according to the CR_LIMIT (based on the changed CBR). In other words, in the proposed method #3, a UE may transmit at a specific time point the information related to how much more the UE will perform transmission.

For example, if it is found from the CR_LIMIT that 10 transmissions are allowed, and 7 transmissions have already been performed at a specific time point that a UE performs transmission, information about the number of remaining transmissions may indicate that three more transmissions will be performed.

[Proposed Method #4] As one example, as the speed and/or sync source type (for example, GNSS or eNB) of a UE changes, MCS and/or the number of (PSSCH) PBs and/or (minimum/maximum) allowed range related to the number of re-transmissions per TB may be configured (or signaled) differently.

Here, as one example, If the RADIO-LAYER (TX) PARAMETER restriction range (LIMRNG_A) based on the corresponding rule (under a specific environment (or situation)) and the RADIO-LAYER (TX) PARAMETER restriction range (LIMRNG_B) according to the (aforementioned) CBR measurement value and/or V2X message priority are (partly) different from each other, (A) within an intersection (restriction) range (for example, RB SIZE 5-8) between the LIMRNG_A (for example, RB SIZE 3-10) and LIMRNG_B (for example, RB SIZE 5-8), the RADIO-LAYER (TX) PARAMETER may be made to be (finally) selected and/or (B) according to the minimum value between the LIMRNG_A and LIMRNG_B (for example, the minimum value of the number of (PSSCH) RBs related to LIMRNG_A/LIMRNG_B (and/or the number of re-transmissions per TB)), the RADIO-LAYER (TX) PARAMEER may be made to be (finally) selected and/or (C) (when an intersection (restriction) range does not exist between LIMRNG_A and LIMRNG_B) (according to predefined (network) signaling) LIMRNG_B (or LIMRNG_A) based RADIO-LAYER (TX) PARAMETER selection may be made to be (optionally) performed.

As one example, when the proposed method #4 is applied, since the UE may use the RADIO-LAYER (TX) PARAMETER that satisfies LIMRNG_A and LIMRNG_B for V2X communication (as much as possible), it may be useful in terms of the overall system performance/reliability (or V2X communication reliability).

Since examples of the proposed method may also be included as one of methods for implementing the present invention, it is apparent that the examples may be regarded as a kind of proposed methods. In addition, although the proposed methods above may be implemented independently, they may be implemented in the form of a combination (or merge) of part of the proposed methods.

As one example, although the proposed methods of the present invention have been described based on the 3GPP LTE system for the convenience of descriptions, the range of systems to which the proposed methods are applied may be extended to the systems other than the 3GPP LTE system.

As one example, the proposed methods of the present invention may be extended even for D2D communication. Here, as one example, D2D communication refers to communication by a UE with other UE directly through a radio channel, wherein, as one example, the UE may indicate a user terminal, but network equipment such as an eNB may also be regarded as a kind of UE when the network equipment transmits and receives signals according to a communication method employed between UEs.

Also, as one example, the proposed methods of the present invention may be applied limitedly only to MODE 3 V2X operation (and/or MODE 4 V2X operation). Also, as one example, the proposed methods of the present invention may be applied limitedly only when the CBR measurement value is increased (and/or decreased) (before resource re-reservation is triggered) after resource reservation is performed.

Figure 12:
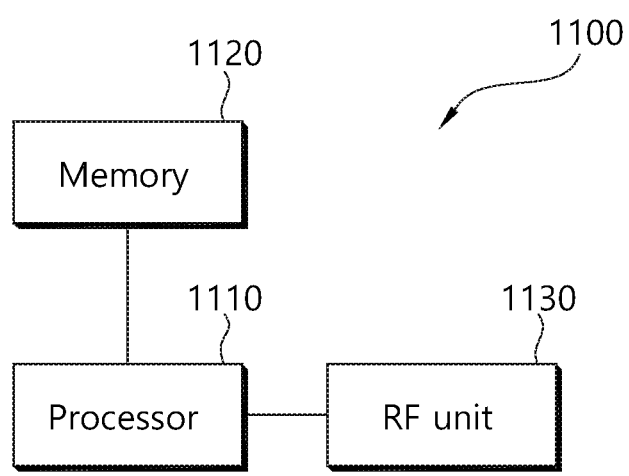
FIG. 12 is a block diagram illustrating a UE in which an embodiment of the present invention is implemented.

FIG. 12 is a block diagram illustrating a UE in which an embodiment of the present invention is implemented.

Referring to FIG. 12, the UE 1100 comprises a processor 1110, memory 1120, and Radio Frequency (RF) unit 1130.

According to one embodiment, the processor 1110 may embody the function/operation/method described with respect to the present invention. For example, the processor 1110 may be configured to determine whether the CBR value has changed after resource reservation is performed, perform V2X communication based on the determination, and when the CBR values is changed after the resource reservation is performed, perform the V2X communication based on the changed CBR value.

The RF unit 1130, being connected to the processor 1110, transmits and receives a radio signal.

The processor 2511, 2521 may include Application-Specific Integrated Circuit (ASIC), other chipset, logical circuit and/or data processing device. The memory may include Read-Only Memory (ROM), Random Access Memory (RAM), flash memory, memory card, storage medium and/or other storage device. The RF unit may include a baseband circuit for processing a radio signal. When an embodiment is implemented by software, the aforementioned method may be implemented by a module (process or function) which performs the aforementioned function. The memory may be installed inside or outside the processor and may be connected to the processor via various well-known means.

What is claimed is:

1. A method for performing Vehicle-to-X (V2X) operation by a V2X User Equipment (UE) in a wireless communication system, the method comprising:
   determining whether a Channel Busy Radio (CBR) value has changed after a resource reservation is performed; and
   performing V2X communication based on the determination,
   wherein based on the CBR value changing after the resource reservation is performed, the V2X communication is performed based on the changed CBR value, and
   wherein, based on the CBR value being increased after the resource reservation is performed, the V2X UE signals change information of a transmission period.

2. The method of claim 1, wherein, based on the CBR value increasing after the resource reservation is performed, the V2X UE performs the V2X communication based on changed frequency resources.

3. The method of claim 2, wherein the V2X UE performs the V2X communication based on reduced frequency resources.

4. The method of claim 3, wherein the V2X UE performs the V2X communication based on the reduced frequency resources and existing time resources.

5. The method of claim 1, wherein, based on the CBR value increasing after the resource reservation is performed, the V2X UE performs the V2X communication based on a sub-set of existing frequency resources or existing time resources.

6. The method of claim 5, wherein, based on the V2X UE performing transmission with a period longer than a previous period, the V2X UE performs transmission as many times as allowed by using a sub-set of reserved resources with the previous period.

7. The method of claim 1, wherein, based on the CBR value increasing after the resource reservation is performed, the V2X UE signals information about whether to perform re-transmission.

8. The method of claim 1, wherein, based on the CBR value increasing after the resource reservation is performed, the V2X UE signals information about the number of remaining transmissions.

9. The method of claim 1, wherein, based on a change of the CBR value being larger than a preconfigured threshold value, the V2X UE determines that the CBR value has changed after the resource reservation is performed.

10. The method of claim 1, wherein, based on the CBR value changing before the resource re-reservation is triggered after the resource reservation is performed, the V2X UEs performs the V2X communication based on the changed CBR value.

11. A Vehicle-to-X (V2X) User Equipment (UE), comprising:
   a Radio Frequency (RF) unit transmitting and receiving a radio signal; and
   a processor operating in conjunction with the RF unit, wherein the processor is configured to:
   determine whether a Channel Busy Radio (CBR) value has changed after a resource reservation is performed; and
   perform V2X communication based on the determination,
   wherein, based on the CBR value changing after the resource reservation is performed, the V2X communication is performed based on the changed CBR value, and
   wherein, based on the CBR value being increased after the resource reservation is performed, the V2X UE signals change information of a transmission period.

* * * * *